(12) United States Patent
Jackson

(10) Patent No.: US 11,165,589 B2
(45) Date of Patent: Nov. 2, 2021

(54) TRUSTED AGENT BLOCKCHAIN ORACLE

(71) Applicant: ShapeShift AG, Sarnen (CH)

(72) Inventor: Mark Daniel Jackson, Fort Collins, CO (US)

(73) Assignee: SHAPESHIFT AG, Sarnen (CH)

( * ) Notice: Subject to any disclaimer, the term of this patent is extended or adjusted under 35 U.S.C. 154(b) by 258 days.

(21) Appl. No.: 15/976,730

(22) Filed: May 10, 2018

(65) Prior Publication Data
US 2018/0331835 A1 Nov. 15, 2018

Related U.S. Application Data

(60) Provisional application No. 62/602,940, filed on May 11, 2017.

(51) Int. Cl.
*H04L 9/32* (2006.01)
*G06Q 20/38* (2012.01)

(52) U.S. Cl.
CPC ....... *H04L 9/3247* (2013.01); *G06Q 20/3829* (2013.01); *H04L 9/3236* (2013.01); *H04L 9/3297* (2013.01); *G06Q 2220/00* (2013.01); *H04L 2209/38* (2013.01); *H04L 2209/56* (2013.01)

(58) Field of Classification Search
CPC ... H04L 9/3247; H04L 9/3297; H04L 9/3236; H04L 2209/56; H04L 2209/38; G06Q 20/3829; G06Q 2220/00
See application file for complete search history.

(56) References Cited

U.S. PATENT DOCUMENTS

| | | | | |
|---|---|---|---|---|
| 10,608,825 B2 * | 3/2020 | Berg | ..................... | H04L 9/3255 |
| 2004/0068757 A1 * | 4/2004 | Heredia | ................ | H04L 9/3247 |
| | | | | 725/135 |
| 2006/0085844 A1 * | 4/2006 | Buer | ................. | H04W 12/0609 |
| | | | | 726/4 |

(Continued)

OTHER PUBLICATIONS

International Search Report of the International Bureau, US International Searching Authority dated Aug. 1, 2018 in counterpart PCT case No. PCT/US2018/032242.

(Continued)

*Primary Examiner* — Aravind K Moorthy
(74) *Attorney, Agent, or Firm* — Sanderson IP Law, Ltd.

(57) ABSTRACT

A trusted blockchain oracle observes events extrinsic to a blockchain to yield an indication of the extrinsic event suitable for submission to a decentralized application on a blockchain. The trusted blockchain oracle signs the indications of the extrinsic events to yield a signed blockchain record. The trusted blockchain oracle publishes a feed of the signed blockchain records or otherwise distributes the signed blockchain records to potential users of the decentralized application at low computational cost. Users who wish to submit a signed blockchain record to the decentralized application may form and broadcast their own transactions including the signed blockchain record and bear the costs of confirming the transaction to the blockchain. The trusted blockchain oracle is thus relieved of the costs of confirming extrinsic events online and may provide a much larger amount of extrinsic event indications than would otherwise be possible.

19 Claims, 9 Drawing Sheets

(56) References Cited

U.S. PATENT DOCUMENTS

| | | | |
|---|---|---|---|
| 2012/0155635 A1* | 6/2012 | Vaikuntanathan | H04L 9/0894 380/44 |
| 2014/0208111 A1* | 7/2014 | Brandwine | G06F 9/45558 713/171 |
| 2014/0258724 A1* | 9/2014 | Lambert | H04L 63/0442 713/170 |
| 2015/0363876 A1 | 12/2015 | Ronca et al. | |
| 2015/0379510 A1 | 12/2015 | Smith | |
| 2016/0127133 A1* | 5/2016 | Pinder | H04L 9/3265 713/176 |
| 2016/0150412 A1* | 5/2016 | Liu | H04L 63/20 370/338 |
| 2016/0371771 A1* | 12/2016 | Serrano | G06Q 40/025 |
| 2017/0046689 A1* | 2/2017 | Lohe | G06Q 20/3823 |
| 2017/0048234 A1* | 2/2017 | Lohe | G06F 3/04886 |
| 2017/0048235 A1* | 2/2017 | Lohe | G06Q 20/10 |
| 2017/0085545 A1* | 3/2017 | Lohe | G06Q 20/389 |
| 2017/0091756 A1* | 3/2017 | Stern | H04L 9/3236 |
| 2017/0154331 A1* | 6/2017 | Voorhees | H04L 67/20 |
| 2017/0163733 A1* | 6/2017 | Grefen | H04L 67/20 |
| 2017/0177636 A1* | 6/2017 | Nguyen | G06F 16/2477 |
| 2017/0221052 A1* | 8/2017 | Sheng | G06Q 20/3829 |
| 2017/0230189 A1* | 8/2017 | Toll | H04L 9/3247 |
| 2017/0236123 A1* | 8/2017 | Ali | G06Q 20/3825 705/75 |
| 2017/0269055 A1* | 9/2017 | Goyal | G01N 33/2841 |
| 2017/0287068 A1* | 10/2017 | Nugent | G06Q 20/08 |
| 2017/0323294 A1* | 11/2017 | Rohlfing | G06Q 20/3674 |
| 2017/0353309 A1* | 12/2017 | Gray | G06Q 20/3829 |
| 2018/0109387 A1* | 4/2018 | Vyas | G06F 8/71 |
| 2018/0123882 A1* | 5/2018 | Anderson | H04L 41/0813 |
| 2018/0152890 A1* | 5/2018 | Jia | H04W 52/0203 |
| 2018/0157999 A1* | 6/2018 | Arora | G06Q 10/02 |
| 2018/0253702 A1* | 9/2018 | Dowding | G06Q 20/223 |
| 2018/0267598 A1* | 9/2018 | Pulivendula | G06F 21/575 |
| 2018/0268491 A1* | 9/2018 | Cuomo | G06Q 10/0833 |
| 2018/0276663 A1* | 9/2018 | Arora | G06Q 20/3829 |
| 2018/0308072 A1* | 10/2018 | Smith | G06Q 20/02 |
| 2018/0331832 A1* | 11/2018 | Pulsifer | H04L 9/0637 |
| 2018/0332011 A1* | 11/2018 | Gray | G06Q 20/382 |
| 2019/0057382 A1* | 2/2019 | Wright | H04L 9/3247 |
| 2019/0340361 A1* | 11/2019 | Daniel | H04W 12/10 |
| 2019/0378153 A1* | 12/2019 | Eich | G06Q 20/367 |
| 2019/0378166 A1* | 12/2019 | Eich | G06Q 30/0272 |
| 2020/0076576 A1* | 3/2020 | Ahlback | H04L 9/0637 |
| 2020/0084222 A1* | 3/2020 | William | H04L 9/0869 |
| 2020/0143471 A1* | 5/2020 | Jackson | H04L 9/3239 |
| 2020/0202358 A1* | 6/2020 | McClelland | G06Q 20/02 |
| 2020/0412525 A1* | 12/2020 | Katsak | G06F 16/1815 |
| 2021/0001223 A1* | 1/2021 | Zhang | A63F 13/533 |
| 2021/0097134 A1* | 4/2021 | Livshits | G06F 16/986 |
| 2021/0099311 A1* | 4/2021 | Saponaro | H04L 51/046 |

OTHER PUBLICATIONS

Written Opinion of the International Bureau, US International Searching Authority dated Aug. 1, 2018 in counterpart PCT case No. PCT/US2018/032242.

Vitalik Buterin, "Ethereum and Oracles," The Ethereum Foundation Blog, blog post dated Jul. 22, 2014.

Thomas Bertani, "Oraclize, the provably-honest oracle service, is finally here!," Medium.com post dated Nov. 4, 2015.

* cited by examiner

TRUSTED AGENT BLOCKCHAIN ORACLE

BACKGROUND OF THE INVENTION

Blockchains provide shared consensus among a network of participants according to a set of consensus rules. Some blockchains include scripting or general-purpose computing abilities that allow participants to deploy executable code on the blockchain (e.g., a smart contract). If a smart contract on a blockchain depends on information intrinsic to the blockchain, for example the existence of a successful payment of funds from one address to another on the blockchain, then the validators of the chain who enforce the consensus rules need only to have in their possession a copy of the ledger to arrive at consensus regarding execution of the smart contract.

Smart contracts may also depend on information extrinsic to a blockchain, such as on the completion of a real-world event. Since information extrinsic to a blockchain is not directly knowable by the validators enforcing the blockchain's set of consensus rules, a blockchain "oracle" may supply the extrinsic information by recording it to the blockchain where it can be read by network validators with access to a copy of the blockchain.

An oracle arrangement requires a degree of trust on the part of any party running or using an extrinsic information-dependent smart contract because the oracle must be trusted to supply reliable information. An oracle may supply a history of its reporting of extrinsic information such that potential users can compare the oracle's reported information regarding real-world events to other sources of information regarding the same events. If an oracle has a history of supplying accurate information (or at least information that is accurate enough for a user's purposes), then a user could choose to trust the oracle to continue to provide accurate information in the future.

Some real-world events include data that is constantly changing, such as the latest price at which market trades are occurring on a cryptocurrency exchange, the temperature or weather at a geographic location, traffic or transportation conditions, and/or other measurements that become stale quickly. Writing any data to a blockchain is almost always associated with a cost (e.g., transaction fees, "rent" costs to write to the blockchain state, etc.). It can thus be economically infeasible for an oracle to pay the costs of frequently writing data representing updates to a real-world event to a blockchain. Often, the price of writing the extrinsic data to the blockchain would represent economic waste if no participants wish to use the extrinsic data before it becomes stale. Accordingly, there is a need for a way for blockchain oracles to supply an arbitrary amount of information to blockchain network participants regarding extrinsic events without incurring high and potentially wasted expenses of writing the extrinsic information directly to the blockchain.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention, and explain various principles and advantages of those embodiments.

Figure 1:
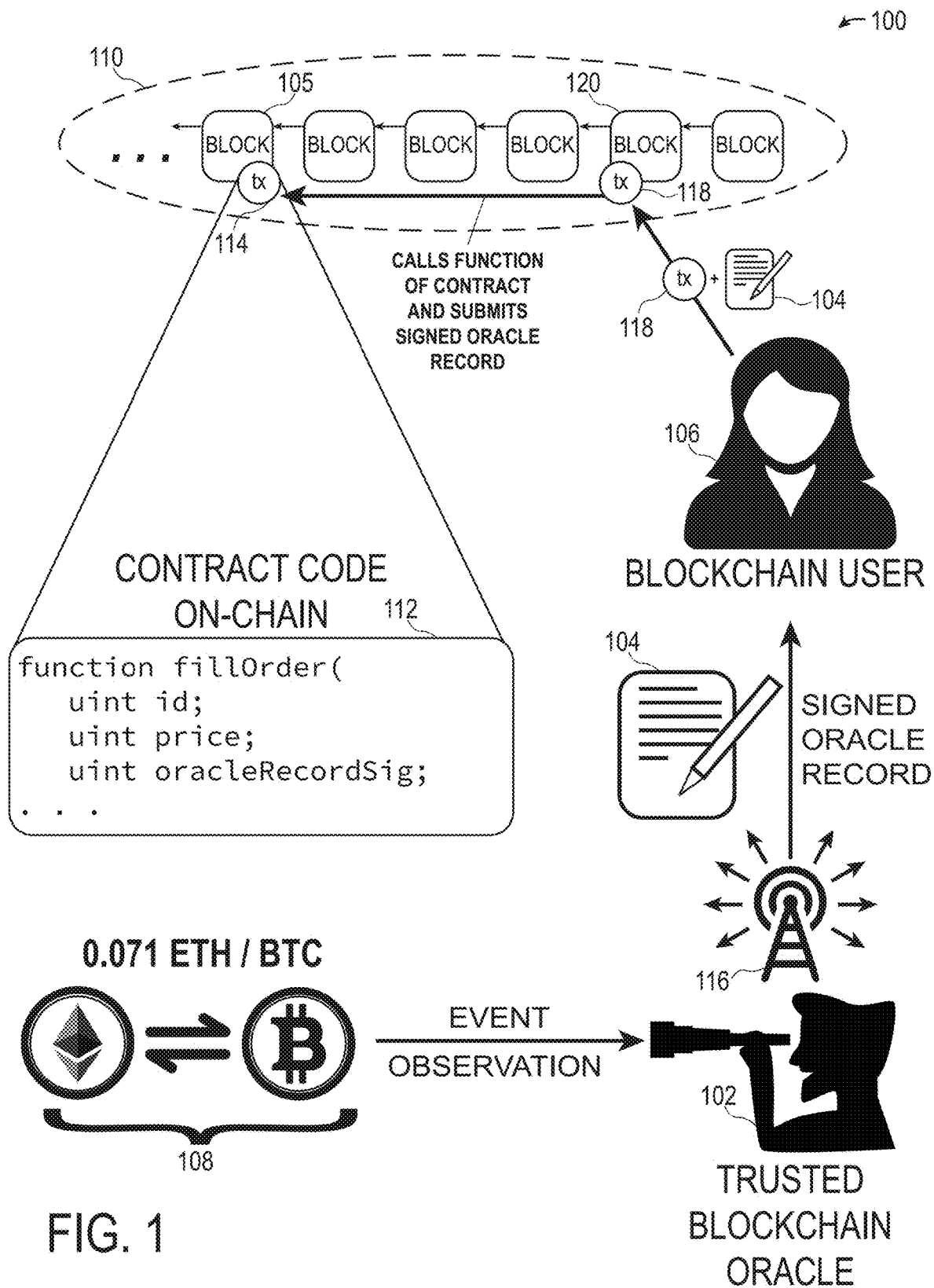
FIG. 1 is a diagram of an example trusted blockchain oracle providing a signed oracle record to a blockchain user in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some blockchains may be viewed as being composed of a sequence of states wherein each state is an incremental change to the prior state of the chain. Changes to state are made when users broadcast valid transactions that are included in new blocks by the validators (e.g., the enforcers of the consensus rules). In other words, each block in the blockchain appends new information to the state that existed before the block was added. Such a system may be said to exhibit decentralized byzantine fault-tolerant consensus because the system is resistant to failures caused by unreliable network participants.

Each transaction may include a series of bytecodes that specify operations or sets of operations to be performed by the validators on the prior state of the blockchain in order to progress to the next state. Examples of operations on the state of a blockchain include storing or modifying data, storing smart contract code, executing previously stored smart contract code, and/or generating events such as the output of smart contract code. A blockchain composed of a progression of states according to externally provided transactions may thus be viewed as a general-purpose state machine suitable for general purpose computing tasks. Applications running on such a general-purpose state machine are referred to herein as smart contracts and/or decentralized applications.

Modifying the state of a blockchain is usually associated with paying a cost because the validators must perform work to run the bytecode. There could also be costs (direct and/or indirect) associated with storing the blockchain and sharing parts of it with other network participants paid by users who wish to change the state of the blockchain. In some cases, these costs can become so high that a contemplated use of a blockchain becomes no longer economical. It is therefore often desirable or necessary to avoid unnecessary changes to a blockchain's state or changes that are likely to never be used.

One type of use case for a consensus-based distributed virtual machine blockchain is to execute code that depends on information extrinsic to the state of the blockchain (e.g., so-called "real-world" events). It can be assumed that the network validators only have access to information stored in the blockchain state itself (referred to herein as "on-chain" information or information intrinsic to the blockchain) because the validators must reach total agreement with one another to be able to successfully update the blockchain. For a decentralized application to depend on extrinsic information, a single entity must act as an arbiter of the representation of the extrinsic information (although the decision may be based on multiple sources of information describing the extrinsic event) to avoid a potential deterministic consensus failure.

One way for a decentralized application that depends on extrinsic event information to work is to collect an indication of the extrinsic event via a blockchain oracle. The blockchain oracle can observe the real-world event and produce an indication of the extrinsic event suitable for use by the decentralized application. The indication of the extrinsic event can be written to the blockchain by inclusion in a state changing transaction where it is accessible to the network validators.

In some cases, the real-world information extrinsic to the blockchain may become stale quickly and a blockchain oracle may wish to "stream" the real-world information with new data points coming in quickly and/or continuously. Storing a stream of extrinsic information to a blockchain may not be practical due to storage costs and transaction fees. If each data point of extrinsic information is associated with a cost, then it is likely uneconomical for a blockchain oracle to bear these costs. In many cases, consumers of the extrinsic information need only a subset (or a small subset) of all the extrinsic event indications observed by the blockchain oracle. Thus, any extrinsic event indications observed by the oracle that are confirmed on the blockchain and never used by consumers may be viewed as wasted.

Instead of confirming every extrinsic event observation to a blockchain, the blockchain oracle may cryptographically sign each observation with a private cryptographic key to yield a signed oracle record for each observation. Signing each record is computationally inexpensive and will not incur any additional costs if it is not confirmed on the blockchain by the oracle. The signed oracle records may be streamed to potential users, published, or transmitted in response to user requests. Once users are in possession of the signed oracle record, the users themselves may decide whether it is economical to confirm the signed oracle record on the blockchain (e.g., choose whether to submit the signed oracle record to a decentralized application). Shifting transaction costs and confirmation decisions from a blockchain oracle to users of the blockchain improves efficiency and usability of decentralized applications that rely on extrinsic events because more oracles will be able to observe extrinsic events and offer streams of signed blockchain records due to lower costs.

If a user chooses to confirm a signed oracle record to the blockchain, then the network validators will be able to prove that the oracle record is authentic and was signed by the oracle by comparing the signed oracle record's digital signature to a known public cryptographic key of the blockchain oracle. For example, on the Ethereum virtual machine, a function ecrecover computes the public key of a message signed by a private key. By comparing the output of ecrecover to a known public key of the blockchain oracle, the validators can determine that the oracle was the true signer. In some implementations, signing keys may be in the form of trusted certificates where the certificates for individual oracles are in turn signed by a root provider.

As used herein, the term "blockchain" refers to any Byzantine fault tolerant decentralized consensus ledger and includes ledgers that may be viewed as not strictly composed of discrete "blocks." For example, the term blockchain includes without limitation a DAG (directed acyclic graph) ledger, a UTXO (unspent transaction output) model ledger, and/or a Swirlds consensus ledger (e.g., Hashgraph).

Using a signed feed of extrinsic event information, it becomes economical for a blockchain oracle to make a large number of observations of events extrinsic to the blockchain, sign a record of each event, and stream the signed records to any user. The costs of confirming the records are shifted to the users, who are in a better position to determine whether it is economical to confirm a signed record to the blockchain. Users and decentralized applications will now have access to a wealth of extrinsic event information that likely cannot be provided by an oracle that confirms its own transactions, especially for decentralized applications that rely on extrinsic event information that becomes stale quickly.

FIG. 1 is a diagram 100 of an example trusted blockchain oracle 102 providing a signed oracle record 104 to a blockchain user 106 in accordance with some implementations. The trusted blockchain oracle 102 observes a "real-world" event 108 extrinsic to a blockchain 110, also referred to herein as an extrinsic event. In the example illustrated in FIG. 1, the extrinsic event 108 is the price of a cryptocurrency trade (e.g., a trade occurring on an exchange, by a broker, or between two private parties). In other examples, the extrinsic event 108 may include any event capable of observation by the trusted blockchain oracle 102. As used herein, an extrinsic "event" includes not only an action or an occurrence, but also an observation of a real-world characteristic (e.g., an observation of weather conditions, etc.).

After observation, the trusted blockchain oracle 102 prepares an oracle record describing the event 108. The oracle record may include direct information regarding the event 108 (e.g., price of the trade) in addition to meta information regarding the event 108 (e.g., platform on which the trade occurred, trading pair volume during a time window on the platform, the time the observed trade occurred, depth of order books when the trade was observed. delta between the observed price and a moving average market clearing price on the platform, etc.). Other types of event observations may include different sets of data and/or metadata.

In some implementations, the oracle record is formatted for, and includes data and metadata compatible with, executable contract code 112 recorded on the blockchain 110 by a previous transaction 114 in a previous block 105. In implementations, the contract code 112 performs actions involving one or more transfers of value based on the information in the oracle record. The previous transaction 114 may have been broadcast to a network of the blockchain 110 by the trusted blockchain oracle 102 or by another actor not illustrated in FIG. 1 (e.g., by a party offering cryptocurrency trades to any participant at a "market rate" as determined by the trusted blockchain oracle 102). For example, the contract 112 may itself hold one of the coins (or a token pegged to one of the coins) involved in the event 108.

Creating a signed oracle record 104 is not a computationally expensive process and may be performed economically for a very large number of observations of the extrinsic event 108. The trusted blockchain oracle need only format the data regarding the event 108 and any metadata regarding the event into a record compatible with the contract code 112. The trusted blockchain oracle 102 may then generate an asymmetric cryptographic key pair consisting of a private cryptographic key and a public cryptographic key based on an input containing a sufficient level of entropy that the same key pair will not be generated again by any other participant. The trusted blockchain oracle 102 can then sign the oracle record with the private cryptographic key to yield the signed oracle record 104. If the public cryptographic key is published and known to other participants (e.g., the creators of the transaction 114 that deployed the contract code 112), then other participants can be confident that the signed oracle record originated with the trusted blockchain oracle 102 because it would be computationally impractical for any other participant to produce the same signature.

Once the trusted blockchain oracle 102 has created a signed oracle record 104, the signed oracle record 104 may be published or broadcast for mass consumption off-chain by a publisher 116. The publisher 116 can be viewed as a stream of signed oracle records, each signed oracle record in the stream corresponding to a unique observation of the event 108. The publisher 116 may push out any or all observations of the event 108 carried out by the trusted blockchain oracle 102 or it may respond to requests for signed oracle records from other participants on the network. In some implementations, a publisher 116 may release a stream composed of multiple signed oracle records representing events observed and signed by separate and distinct trusted oracles 102. Examples of responses to requests for signed oracle records include, for example, signed oracle records for event observations conforming to search parameters (e.g., trade events above a minimum size, the highest/lowest trade over a period of time, etc.) and/or metadata parameters (e.g., trades occurring when there is at least a minimum trade volume on the platform of the event 108, etc.).

A recipient of the signed oracle record includes the blockchain user 106. The blockchain user 106 may be any network participant of the blockchain 110 who requires an oracle record signed by the trusted blockchain oracle 102 to interact with the contract code 112. By broadcasting the signed oracle record 104 from the trusted blockchain oracle 102 to the blockchain user 106, the cost of confirming the signed oracle record 104 is transferred from the trusted blockchain oracle 102 to the blockchain user 106. Thus, the trusted blockchain oracle 102 may publish a stream of signed oracle records based on event observations at little to no cost, and only those signed oracle records that are of value to the blockchain user 106 (or other participants) will be confirmed to the blockchain 110.

Whether any particular signed oracle record 104 is to be broadcast to the network of the blockchain 110 is determined by the blockchain user 106. Depending on network conditions, the cost of submitting a transaction 118 (e.g., a transaction fee sufficient for the transaction 118 to be mined into the blockchain 110) can vary widely. If the network of the blockchain 110 is experiencing network congestion or if the blockchain 110 charges a high fee for storing information to the state of the blockchain (e.g., "rent"), then the cost of confirming the transaction 118 may exceed the value to the blockchain user 106. As such, the blockchain user 106 may decline to broadcast the transaction 118 with the signed oracle record 104. On the other hand, if the value to the blockchain user 106 of interacting with the contract code 112 exceeds the cost of submitting the transaction 118, then the blockchain user 106 can choose to bear the cost and make the transaction. Either way, the cost to the trusted blockchain oracle to provide a stream of signed oracle records remains low and costs are only paid by the blockchain user 106 if it is deemed to be in her interest to do so.

If the blockchain user 106 chooses to include the signed blockchain record 104 in the transaction 118, the transaction is confirmed in block 120 and calls a function of the contract code 112 to submit the signed blockchain record 104 for execution to the contract 114.

Figure 2:
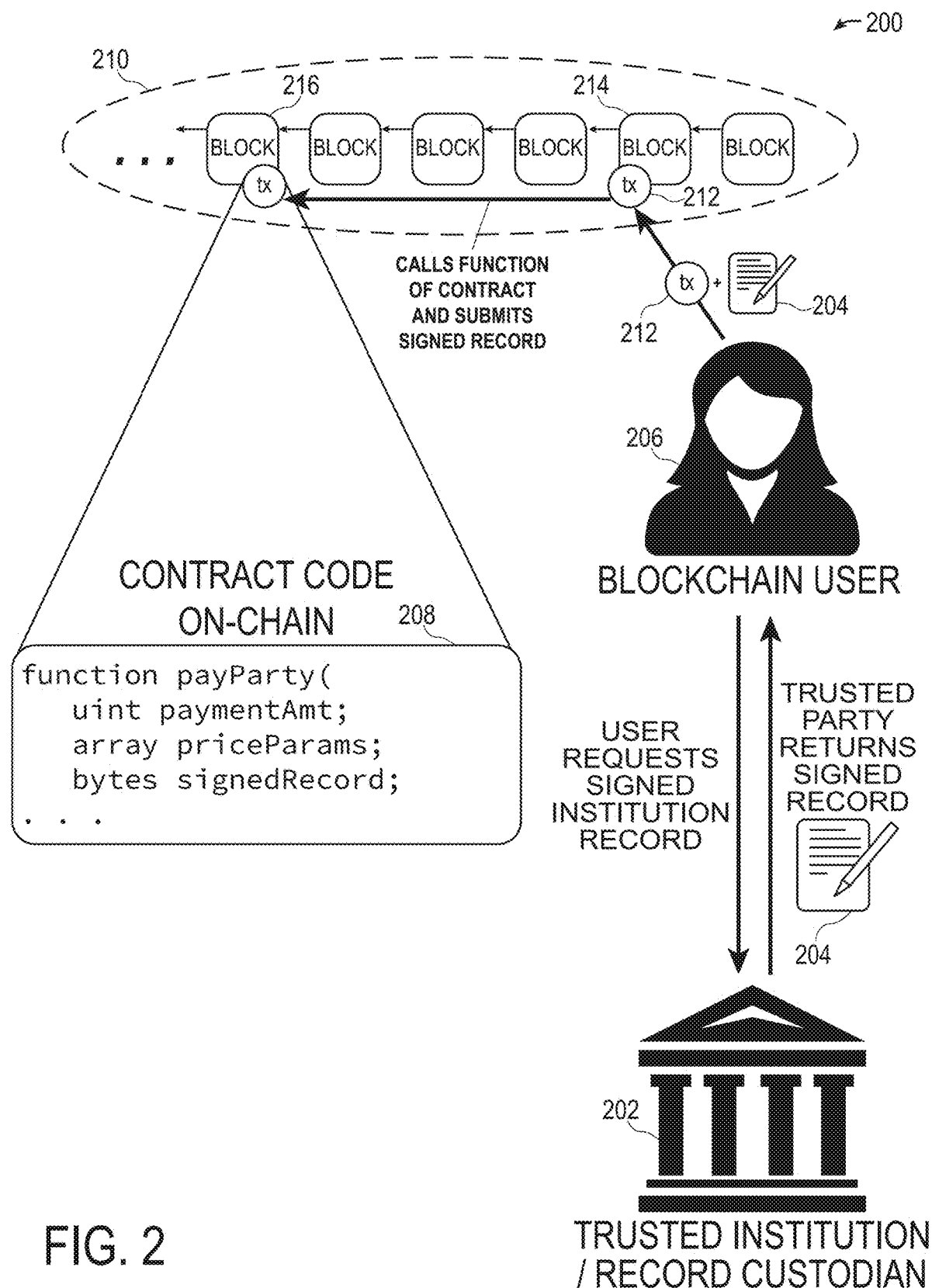
FIG. 2 is a diagram of an example trusted institution oracle providing a signed record to a blockchain user in accordance with some implementations.

FIG. 2 is a diagram 200 of an example trusted institution oracle 202 providing a signed record to a blockchain user 206 in accordance with some implementations. The trusted institution 202 may not make an observation of an external event, but rather may be itself the custodian of records of relevance to a contract 208 on a blockchain 210.

Rather than publishing a public feed of signed observations regarding real-world events, the trusted institution 202 may respond to a request from a blockchain user 206 to sign a record or records relating to the blockchain user 206. For example, the trusted institution 202 may be a bank or financial services provider wherein the blockchain user 206 has a checking account. The blockchain user 206 may request a signed record from the bank, such as an entry in the bank's payment ledger showing the blockchain user 206 made a payment to a third party.

In other implementations, the trusted institution 202 may sign every record that may be of interest to the blockchain user 206 (e.g., signing a record of every transaction made from the checking account of the blockchain user 206). Since signing records is inexpensive off-chain, the trusted institution 202 need not spend resources determining which records should be signed. Signed copies of all of the records associated with the blockchain user 206 may thus be provided to the blockchain user (e.g., every time the blockchain user 206 logs into her account at the trusted institution 202).

When the blockchain user 206 receives the signed blockchain record 204 from the trusted institution 202, she may form a transaction 212 valid on the blockchain 210 that includes the signed oracle record 204 and broadcast the transaction 212 to a network of the blockchain 210, paying a transaction fee as she deems appropriate. Once the transaction 212 is confirmed in block 214 in the chain 210, the transaction 212 can call a function of the contract 208 in the earlier block 216. For example, the contract 208 may be programmed to release funds to a third party upon proof that the blockchain user 206 has made the payment represented by the signed record 204.

Figure 3:
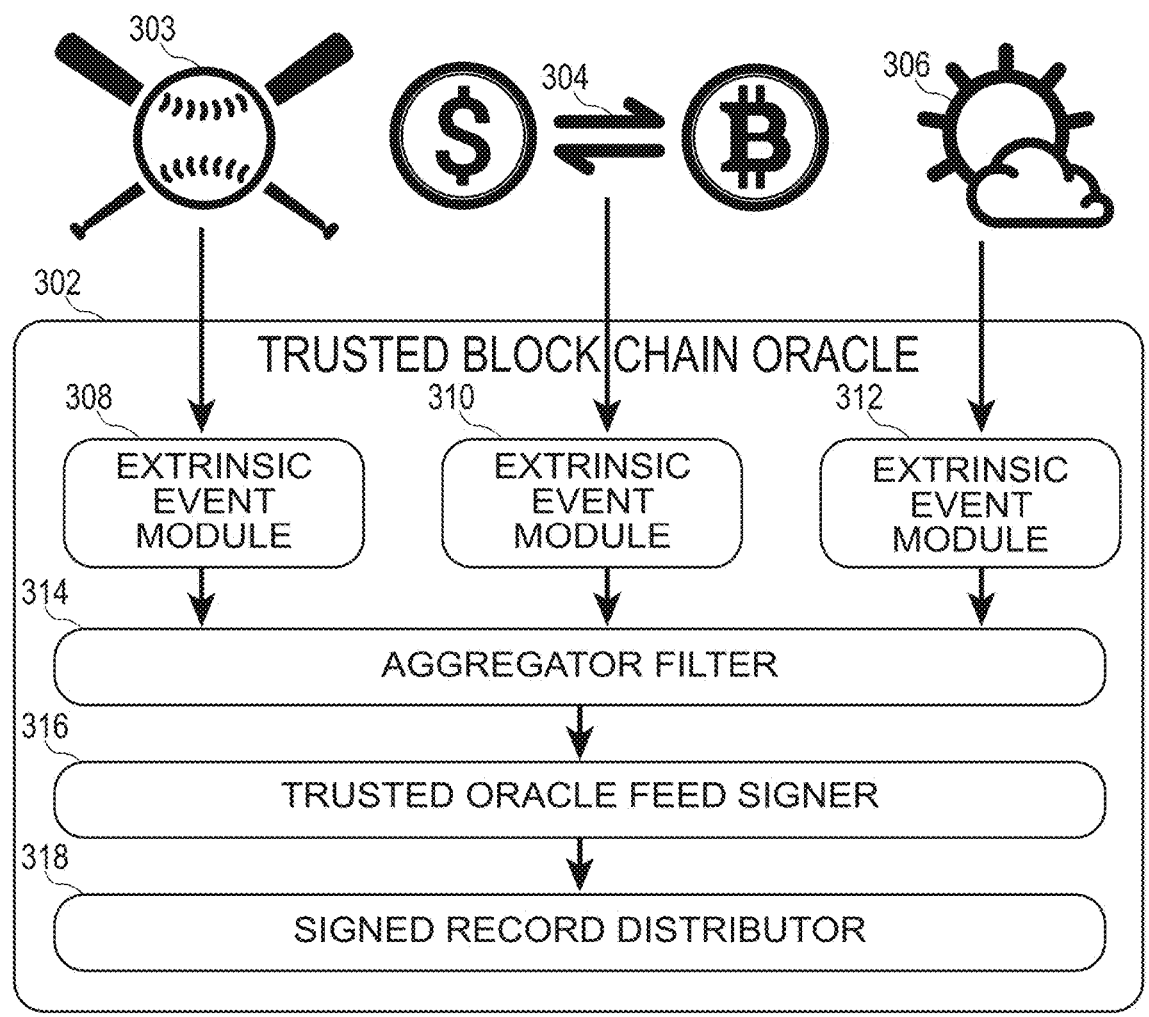
FIG. 3 is a block diagram of example events extrinsic to a blockchain collected by a trusted blockchain oracle in accordance with some implementations.

FIG. 3 is a block diagram 300 of example events extrinsic to a blockchain collected by a trusted blockchain oracle 302 in accordance with some implementations. The trusted blockchain oracle 302 includes various components for carrying out the functions described herein. One set of components are extrinsic event modules 308, 310, and 312. The example illustrated in FIG. 3 includes three extrinsic event modules, but any number of extrinsic event modules are possible.

Each of the three extrinsic event modules illustrated in FIG. 3 is associated with a particular type of event extrinsic to a blockchain. For example, extrinsic event module 303 is associated with Major League Baseball (MLB) events. In this example, the extrinsic event module collects the outcome of an event (the winner of an MLB game) as well as metadata regarding the game (e.g., location of game, time of game, length of game, date of game, player statistics from the game, etc.).

The extrinsic event outcome and metadata may be collected according to methods deemed appropriate by the trusted blockchain oracle 302. Since the use of any blockchain oracle involves a measure of trust of that oracle, it is up to the parties depending on the oracle data to determine whether the oracle is sufficiently trustworthy for their purposes and whether the collection methods employed are accurate enough to satisfy their needs. The extrinsic event module 303 may, for example, employ manual entry of the extrinsic event information by a witness, data from an official MLB data feed, etc.

FIG. 3 also includes example extrinsic event modules 310 and 312. Extrinsic event module 310 collects extrinsic event information regarding fiat/cryptocurrency trade events 304. In this example, the event includes a price at which the USD/BTC occurs on a platform and metadata includes volume on the platform in a time period, time of the reported trade, etc. Extrinsic event module 312 collects extrinsic event information regarding weather conditions 306 at Heathrow Airport. Example metadata to the event 306 includes temperature, wind speed, time of reading, etc.

Another component of the trusted blockchain oracle 302 is an aggregator filter 314. The aggregator filter processes the information describing the event extrinsic to the blockchain to yield an indication of the event extrinsic to the blockchain suitable to be signed and included in a blockchain transaction. In one implementation, the aggregator filter 314, receives input from multiple extrinsic event modules regarding the same extrinsic event and filters and/or processes the input to yield the indication of the extrinsic event. For example, if the extrinsic event is the price of a cryptocurrency trade, extrinsic event modules may collect price information from a variety of different exchanges. Each exchange may include slightly different prices for the trade since each exchange maintains independent order books that are not identical. In the implementation, the aggregator filter 314 may apply an N-of-M filter (e.g., 2 of 3, 3 of 5, etc.) and discard outlying data points. The remaining N data points can then be averaged to yield a single indication of the extrinsic event.

Another component of the trusted blockchain oracle 302 is the trusted oracle feed signer 316. The trusted oracle feed signer 316 signs the indication of the event extrinsic to the blockchain with a private key of the oracle to produce the signed oracle record of the event extrinsic to the blockchain. Another component of the trusted blockchain oracle 302 is the signed record distributor 318. The signed record distributor 318 may operate on a push model, streaming some or all of the indications of the event extrinsic to the blockchain publicly. In other implementations, the signed record distributor 318 may respond to off-chain requests from blockchain users for particular indications of events extrinsic to the blockchain.

Figure 4:
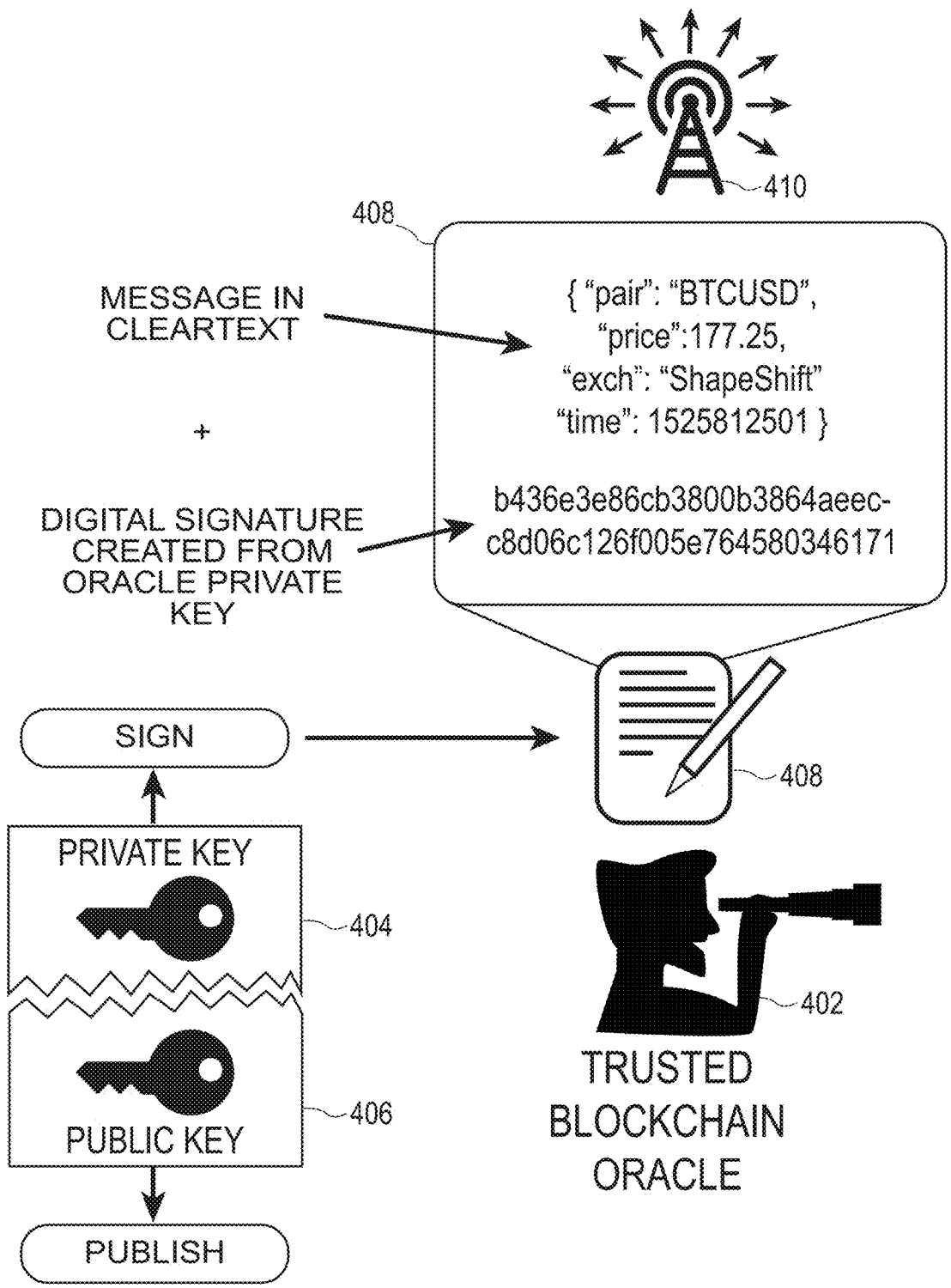
FIG. 4 is a block diagram of a trusted oracle blockchain record in accordance with some implementations.

FIG. 4 is a block diagram 400 of the creation of a trusted oracle blockchain record in accordance with some implementations. A trusted blockchain oracle 402 creates a cryptographic key pair consisting of a private key 404 and a public key 406. The key pair is conducted in a secret process based on the input of a source of entropy sufficient to ensure that the key pair will be unique. The public key 406 is published and/or associated with the trusted blockchain oracle 402. Any decentralized applications deployed to a blockchain or off-chain users can be supplied with a copy of the public key 406.

The private key 404 should not be shared by the trusted blockchain oracle 402 with any other network participant or third party and may be stored in a hardware solution or other cold storage mechanism. If the trusted blockchain oracle 402 reliably keeps the private key 404 secret, then any message signed with the private key 404 implies the message originated with the trusted blockchain oracle 402 and not from a different party. Other network participants who know the public key 406 of the trusted blockchain oracle, such as due to publication at a trusted location, can verify an arbitrary message has been signed by the private key 404 of the trusted blockchain oracle 402.

The signed blockchain record 408 is a message signed by the private key 404 of the trusted blockchain oracle 402. In one implementation, the signed blockchain record 408 includes a text message in cleartext. In the example illustrated by FIG. 4, the cleartext message is in JSON format, but the message can be in any format as long as it is compatible with the input expected by a decentralized application to which the signed blockchain record 408 is to be submitted by the blockchain user to whom the signed blockchain record 408 is sent by the publisher 410. Thus, the cleartext message can include virtually any content of any length. Appended to the cleartext message in the signed blockchain record is a digital signature. The digital signature is an encrypted cryptographic hash digest produced when the trusted blockchain oracle 402 applies a cryptographic hash function (e.g., SHA-256) to the cleartext message. The digital signature of the signed blockchain record 408 is a string of bits produced by encrypting a cryptographic hash digest produced according to the application of two operations. The first operation is applying a cryptographic hash function (e.g., SHA-256) to the cleartext message to obtain an abbreviated bit string representative of the original message. The second operation is encrypting the abbreviated bit string with the private key 404 to obtain the digital signature.

Figure 5:
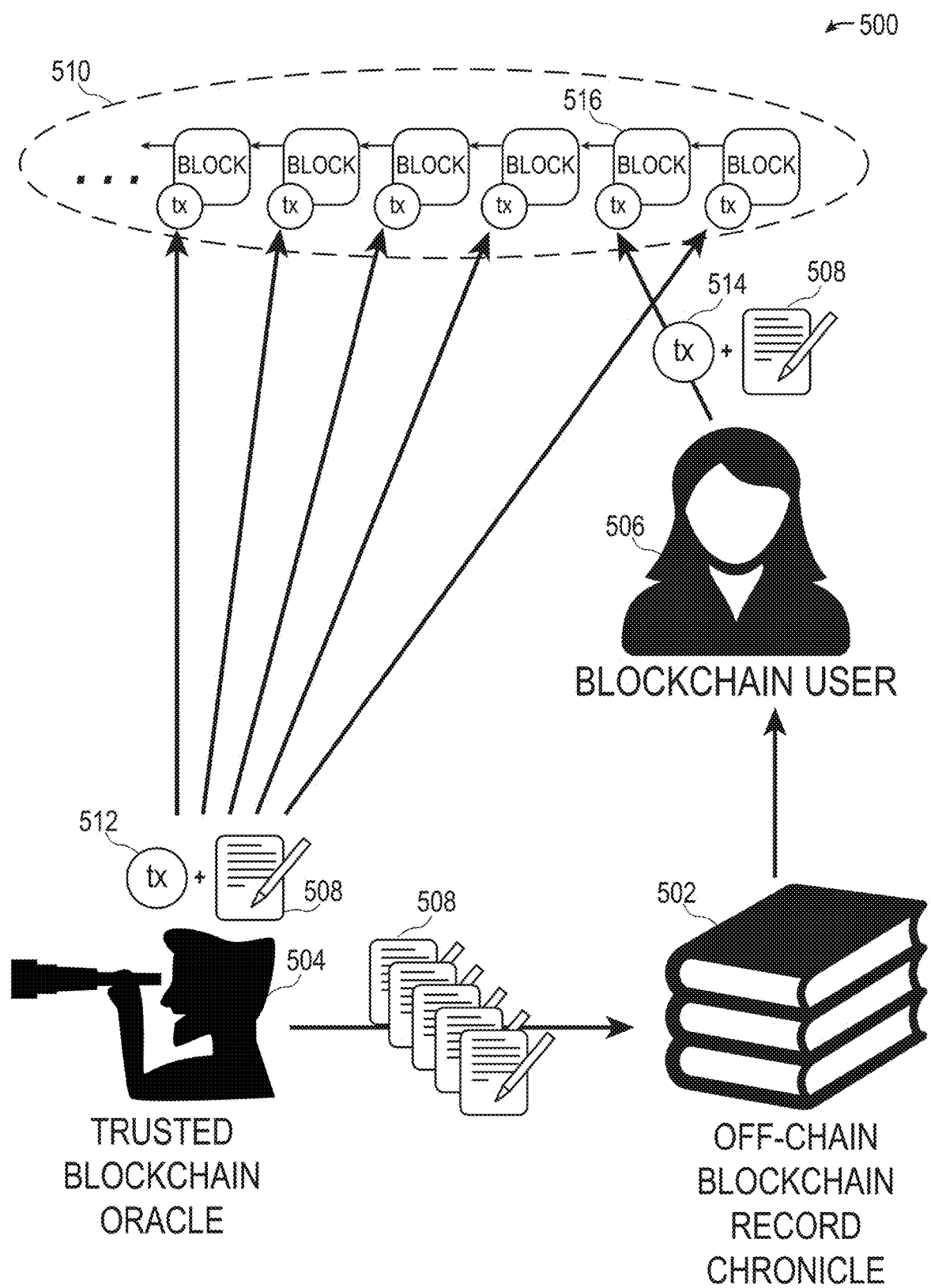
FIG. 5 is a diagram of an example blockchain record chronicle of a trusted blockchain oracle agent in accordance with some implementations.

FIG. 5 is a diagram 500 of an example off-chain blockchain record chronicle 502 established by a trusted blockchain oracle 504 in accordance with some implementations. In some implementations, the trusted blockchain oracle 504 does not rely entirely on the blockchain user(s) 506 to confirm signed blockchain oracle records to the blockchain 510. Instead, the trusted blockchain may form its own valid transactions 512 including signed oracle records 508 and broadcast the transactions 512 itself to the network of the blockchain 510 (e.g., at its own cost).

If the trusted blockchain oracle 504 confirms its own transactions 512 to the blockchain 510, there will form a record of the trusted blockchain oracle 504's reporting of external events. Potential blockchain user(s) 506 can compare the on-chain record of the trusted blockchain oracle 504 to sources of information regarding the extrinsic events available elsewhere to evaluate the accuracy of the trusted blockchain oracle 504. If the record of the observations of the trusted blockchain oracle 504 are stored on the blockchain, then potential blockchain user(s) 506 can have a very high degree of confidence that the record of extrinsic event observations represents the true history of extrinsic event observations made by the trusted blockchain oracle 504 because any party wishing to tamper with the record would need to re-do the proof-of-work calculations needed to form the blockchain 510 history. For blockchains with large amounts of proof-of-work (e.g., blocks added under high difficulty target conditions), it would be very difficult or computationally impractical to re-do the proof of work.

Another way the trusted blockchain oracle 504 can provide a record of extrinsic event observations is to store its blockchain records 508 in an off-chain blockchain record chronicle 502. The off-chain blockchain record chronicle 502 is not as reliable as an on-chain record but may provide for a greater number of blockchain records to potential blockchain user(s) 506 due to lower costs than on-chain storage.

In the implementation illustrated by FIG. 5, the trusted blockchain oracle 504 periodically submits a transaction 512 including a signed blockchain record 508 to be confirmed on-chain. The trusted blockchain oracle 504 may select an interval at which to submit the transactions 512 to establish the on-chain record. The trusted blockchain oracle 504 may monitor the blockchain 510 to determine whether a blockchain user 506 has confirmed a transaction 514 including a signed oracle record 508. If the blockchain user 506 submits her own transaction 514 with a signed blockchain record, the trusted blockchain oracle 504 can choose to skip a regularly scheduled transaction to save costs.

Figure 6:
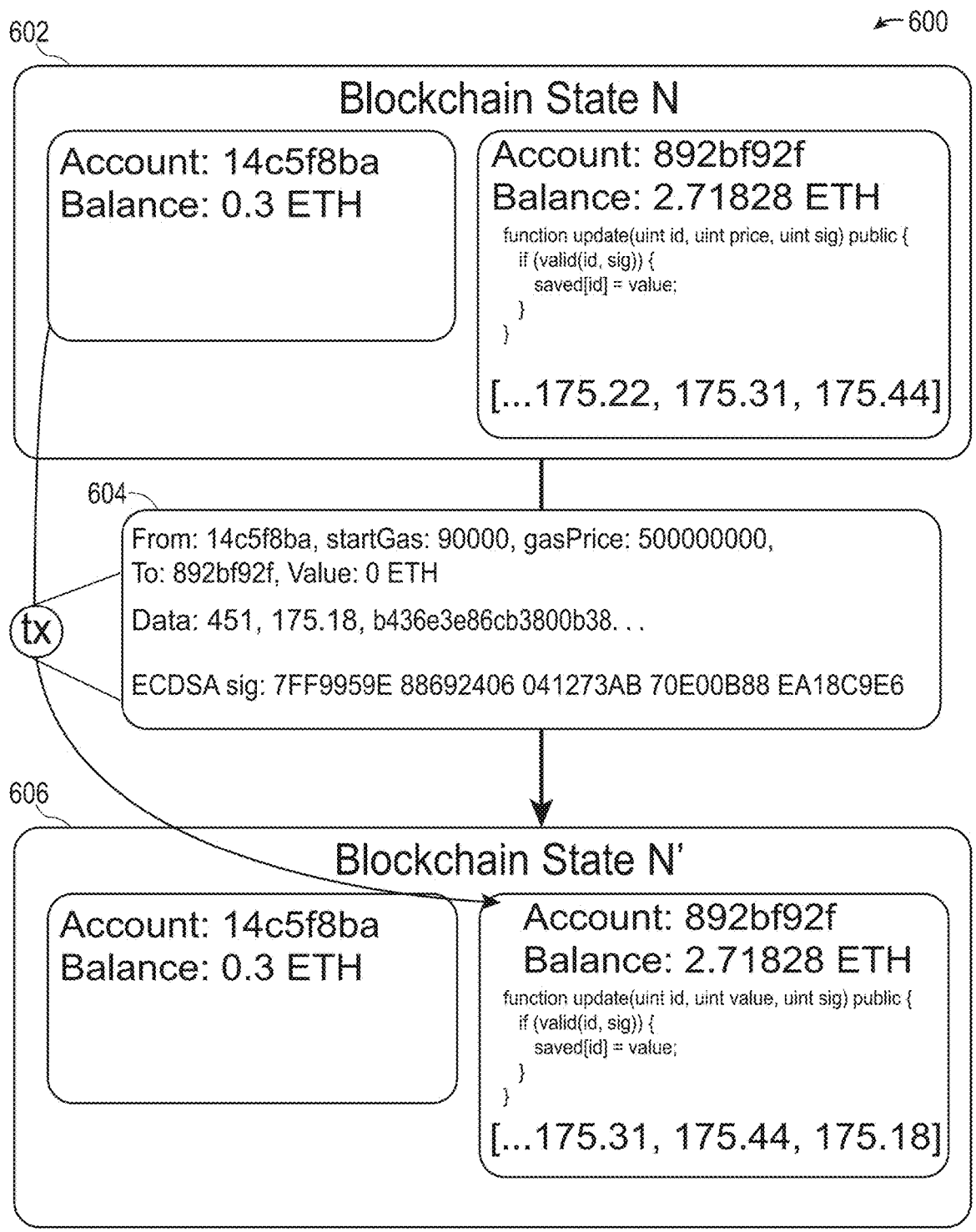
FIG. 6 is a block diagram of an example blockchain state change caused by a trusted oracle blockchain record.

FIG. 6 is a block diagram of an example blockchain state change 600 caused by a trusted oracle blockchain record. Blockchain state N (602) illustrates a user account 14c5f8ba controlled by a user of the blockchain and a contract address 892bf92f. The user account contains a balance of 0.3 ETH in blockchain state N and the contract address has a function and an array of values stored in state. The function of the contract address in this example accepts three parameters: an id value, a price value from the trusted oracle, and a digital signature from the trusted oracle.

To move from Blockchain State N (602) to Blockchain State N' (606), the user account broadcasts a transaction 604 with a value of 0 ETH to the contract address. The transaction 604 includes a data field with the three parameters for the update function of the contract. The first value (451) is an index of the state array of the contract, the second parameter is a new price from the oracle (175.18), and the third parameter is the oracle's digital signature (b436e3e86cb3800b38 . . . ) (truncated for brevity). It should be understood that the third parameter of the data field is a distinct signature from the ECDSA signature of the transaction 604. The oracle's digital signature is a value received by the user from the oracle and used by the contract to verify that the price value originated with the oracle and not another party. The ECDSA signature is appended to the transaction 604 by the blockchain user to prove that the user account 14c5f8ba is the originator of the transaction 604.

Figure 7:
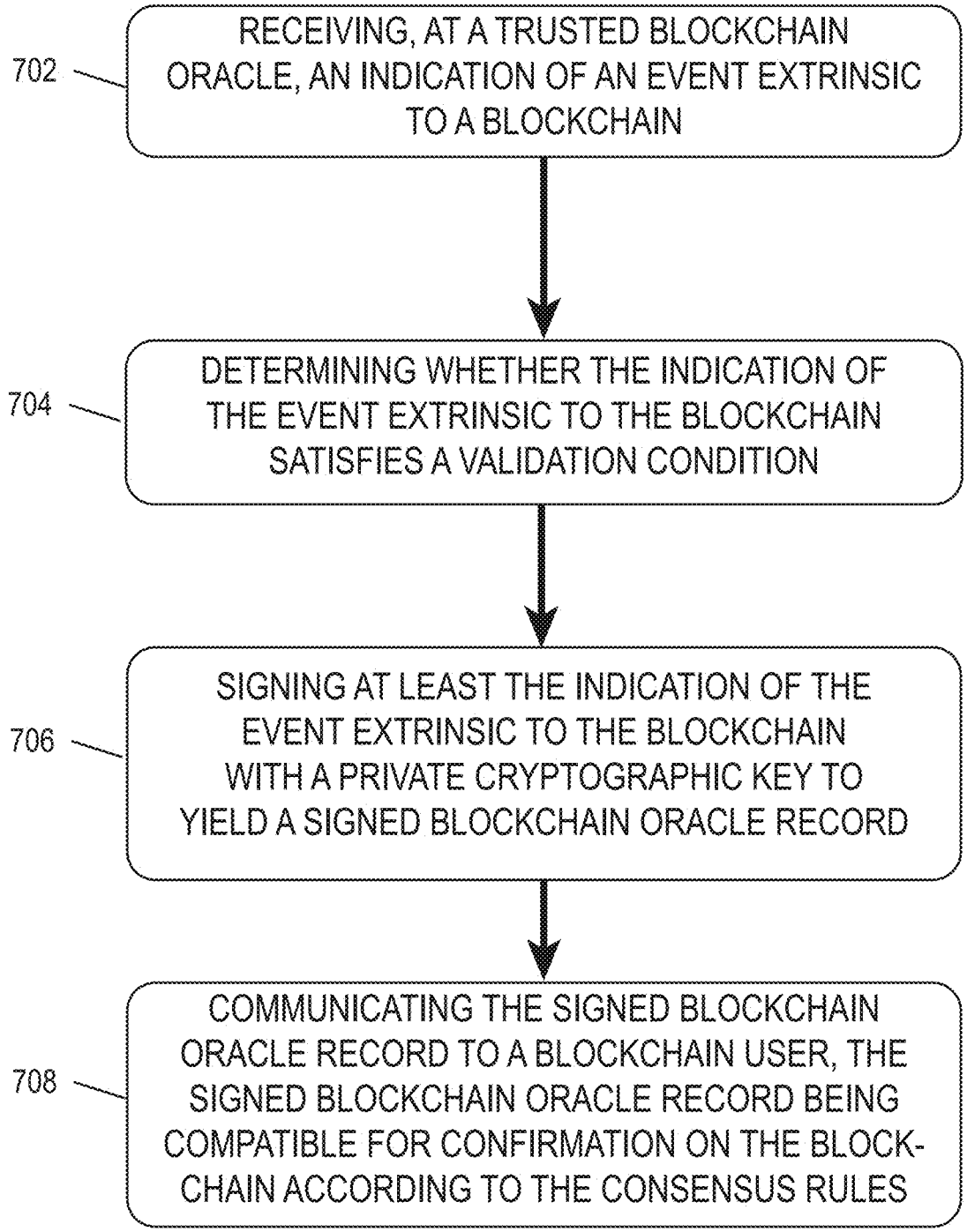
FIG. 7 is a flowchart of an example method of confirming extrinsic event information to a blockchain.

FIG. 7 is a flowchart of an example method 700 of confirming extrinsic event records to a blockchain. A receiving operation 702 receives, at a trusted blockchain oracle, an indication of an event extrinsic to a blockchain, the blockchain applying a set of consensus rules. The event may be a one-time, single occurrence event (e.g., the winner of an election or sporting event, the completion of a legal contract by a party, receipt of a payment, etc.) or it may be an ongoing event (e.g., the weather at a geographic location, the market clearing price of a trading pair on an exchange, traffic conditions, the balance of a financial account, etc.).

The indication of the event extrinsic to the blockchain may include an observation or a set of observations regarding the event. Depending on the observations conducted, the indication of the event may vary. For example, if the event is an ongoing event of the current market price in U.S. dollars for a digital asset, observations may be made by the trusted oracle of multiple exchange platforms and filtered (e.g., averaged, processed, outlying values discarded, volume weighted, etc.). The indication of the event may therefore be a type of estimate or approximation of the extrinsic event. In some cases, there may be no agreed upon value of the extrinsic event and the indication of the event produced by the oracle is merely the result of parameters selected by the oracle to create the approximation.

The indication of the extrinsic event may include parameters regarding its calculation. For example, if the extrinsic event is a recent trading price of a digital asset, then the indication of the event may be based on conditions including without limitation which trading platforms supplied information, whether stablecoins pegged to another currency are included in the calculation or not, whether there is a minimum volume requirement on a platform for inclusion in the indication, a timestamp/datestamp of when the indication was received, etc.

The next operation in the method 700 is a determining operation 704 that determines whether the indication of the event satisfies a validation condition. In some implementations, the validation condition is a sanity check to prevent inaccurate indications of the event in the case the collected data is compromised (e.g., declining to report a market trading price if one of the exchange platforms is under flash-crash conditions). In other implementations, the validation condition is a null condition in which any collected data is satisfactory.

The method 700 then proceeds to a signing operation 706. The signing operation 706 signs at least the indication of the event extrinsic to the blockchain with a private cryptographic key to yield a signed blockchain oracle record if the indication satisfies the validation condition, the private key being paired with a public key associated with the trusted blockchain oracle. The signing operation 706 may include creating a cleartext message of the indication of the extrinsic event (and optionally parameters used to calculate the indication of the extrinsic event) and appending thereto a digital signature produced by the private key. In some implementations, a public key of the trusted oracle is also appended to indicate origin of the signed blockchain record and to facilitate verification of the digital signature by other network participants.

A communicating operation 708 communicates the signed blockchain oracle record to a blockchain user, the blockchain oracle record being compatible for confirmation on the blockchain according to the consensus rules. In one implementation, being compatible for confirmation on the blockchain includes parameters of a function of a decentralized application to be called by the blockchain using the signed oracle record. For example, if a decentralized application requires a market trading price, a minimum volume requirement, and a timestamp to accept an indication of an extrinsic event as true, then the digital signature of the trusted oracle must be applied to all of the foregoing pieces of information in order to cryptographically prove to the decentralized application that the oracle's indication of the extrinsic event is based on the parameters required by the decentralized application.

Figure 8:
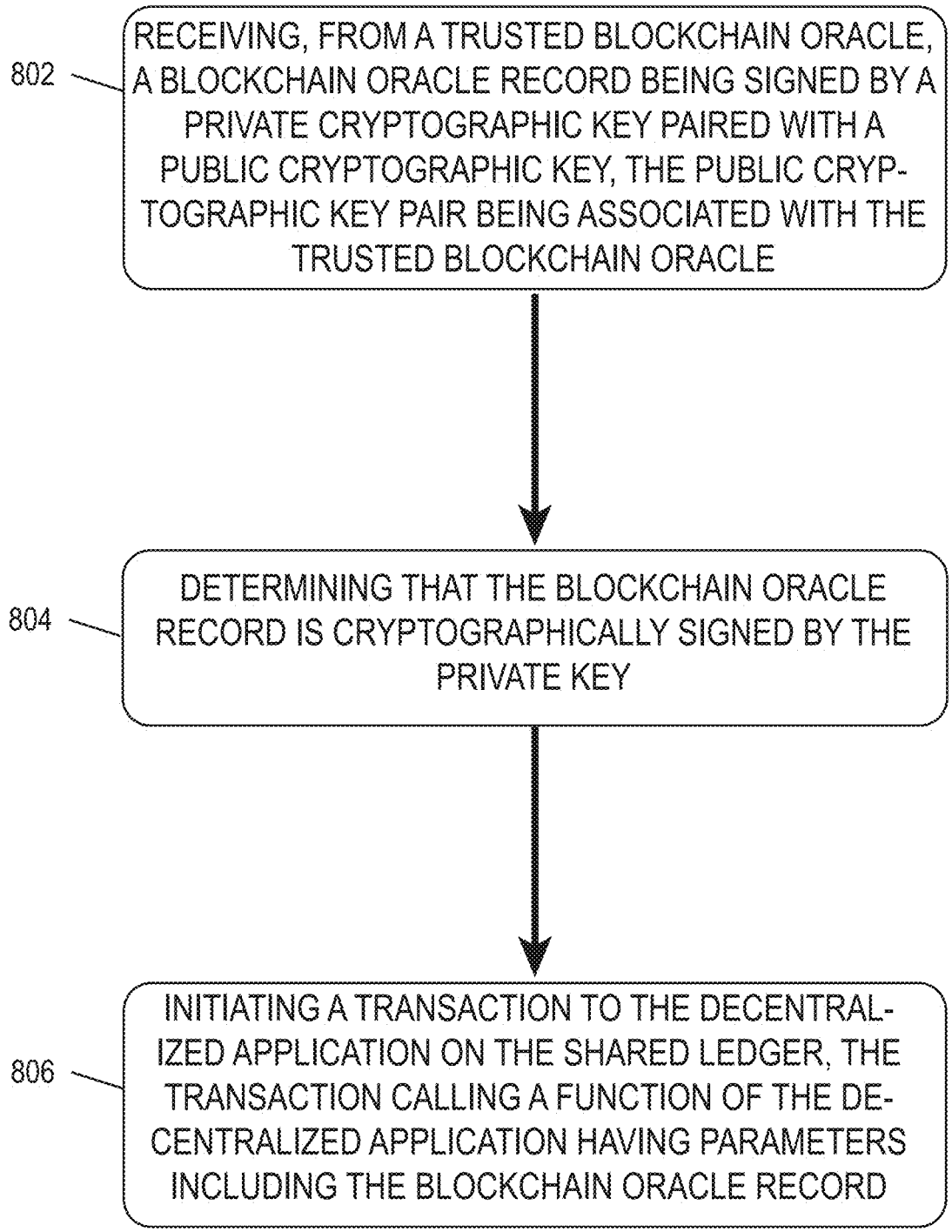
FIG. 8 is a flowchart of an example method of calling a decentralized application on a shared ledger with a blockchain oracle record.

FIG. 8 is a flowchart of an example method 800 of calling a decentralized application on a shared ledger with a blockchain oracle record. A receiving operation 802 receives, from a trusted blockchain oracle, a blockchain oracle record being signed by a private cryptographic key paired with a public cryptographic key, the public cryptographic key being associated with the trusted blockchain oracle. The receiving operation 802 may be the result of a published blockchain oracle record, a blockchain oracle record received in response to a user request (the request optionally including requested parameters used to calculate an indication of the event), a blockchain oracle record retrieved from an off-line chronicle, etc.

A determining operation 804 determines that the blockchain oracle record is cryptographically signed by the private key, such as in a cryptographic operation depending on comparison to a public key known to be owned by the trusted blockchain oracle. An initiating operation 806 initiates a transaction to the decentralized application on the shared ledger, the transaction calling a function of the decentralized application having parameters including the signed oracle record. In some implementations, the initiating operation 806 includes forming a transaction valid on a network of the shared ledger and broadcasting the transaction with a transaction fee to at least one node of the network. In other implementations, the initiating operation does not include a transaction fee such as if the blockchain is a directed acyclic graph, a sharded chain, or any other type of byzantine fault tolerant decentralized consensus system.

Figure 9:
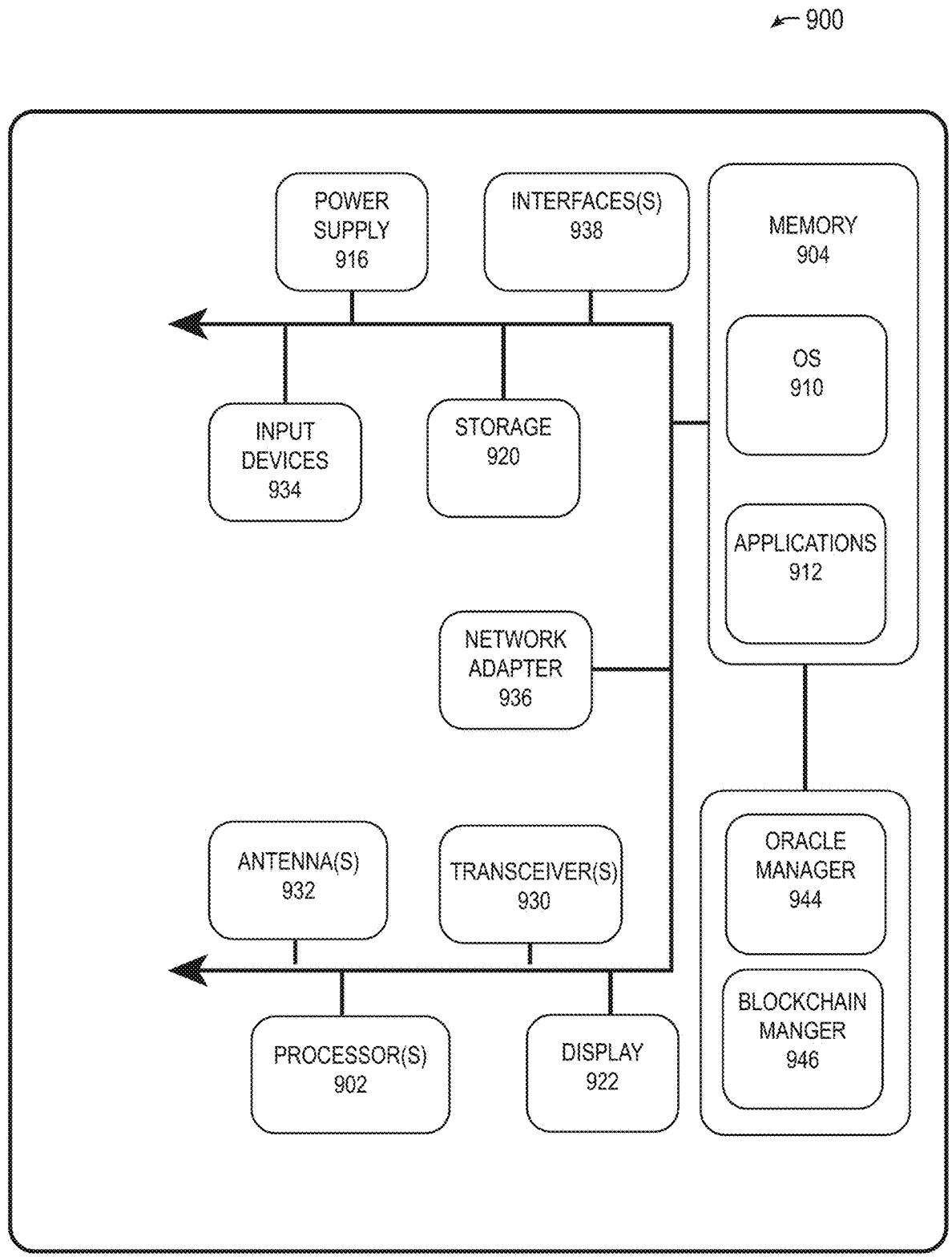
FIG. 9 is a diagram of a system that may be useful for implementing a trusted blockchain oracle.

FIG. 9 is a diagram of a system 900 that may be useful for implementing a trusted blockchain oracle. FIG. 9 illustrates an example system (labeled as a processing system 900) that may be useful in implementing the described technology. The processing system 900 may be a client device, such as a smart device, connected device, Internet of Things (IoT) device, laptop, mobile device, desktop, tablet, or a server/cloud device. The processing system 900 includes one or more processor(s) 902, and a memory 904. The memory 904 generally includes both volatile memory (e.g., RAM) and non-volatile memory (e.g., flash memory). An operating system 910 resided in the memory 904 and is executed by the processor 902.

One or more application programs 912 modules or segments, such as oracle manager 944 and blockchain manager 946 are loaded in the memory 904 and/or storage 920 and executed by the processor 902. In some implementations, the oracle manager 944 is stored in read-only memory (ROM) 914 or write once, read many (WORM) memory. Data such as extrinsic event data sources may be stored in the memory 904 or storage 920 and may be retrievable by the processor 902 for use by oracle manager 944 and the blockchain manager 946, etc. The storage 920 may be local to the processing system 900 or may be remote and communicatively connected to the processing system 900 and may include another server. The storage 920 may store resources that are requestable by client devices (not shown). The storage 920 may include secure storage such as one or more platform configuration registers (PCR) managed by one or more trusted platform modules (TPMs), which may be implemented in a chip or by the trusted execution environment (TEE).

The processing system 900 includes a power supply 916, which is powered by one or more batteries or other power sources and which provides power to other components of the processing system 900. The power supply 916 may also be connected to an external power source that overrides or recharges the built-in batteries or other power sources.

The processing system 900 may include one or more communication transceivers 930 which may be connected to one or more antenna(s) 932 to provide network connectivity (e.g., mobile phone network, Wi-Fi®, Bluetooth®, etc.) to one or more other servers and/or client devices (e.g., mobile devices, desktop computers, or laptop computers). The processing system 900 may further include a network adapter 936, which is a type of communication device. The processing system 900 may use the network adapter 936 and any other types of communication devices for establishing connections over a wide-area network (WAN) or local area network (LAN). It should be appreciated that the network connections shown are exemplary and that other communications devices and means for establishing a communications link between the processing system 900 and other devices may be used.

The processing system 900 may include one or more input devices 934 such that a user may enter commands and information (e.g., a keyboard or mouse). Input devices 934 may further include other types of input such as multimodal input, speech input, graffiti input, motion detection, facial recognition, physical fingerprinting, etc. These and other input devices may be coupled to the server by one or more interfaces 938 such as a serial port interface, parallel port, universal serial bus (USB), etc. The processing system 900 may further include a display 922 such as a touch screen display.

The processing system 900 may include a variety of tangible processor-readable storage media and intangible processor-readable communication signals including in virtual and/or cloud computing environment. Tangible processor-readable storage can be embodied by any available media that can be accessed by the processing system 900 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing system 900. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

In one implementation is disclosed a method of confirming extrinsic event records to a blockchain of receiving, at a trusted blockchain oracle, an indication of an event extrinsic to a blockchain, the blockchain applying a set of consensus rules, determining whether the indication of the event extrinsic to the blockchain satisfies a validation condition, signing at least the indication of the event extrinsic to the blockchain with a private cryptographic key to yield a signed blockchain oracle record if the indication satisfies the validation condition, the private key being paired with a public key associated with the trusted blockchain oracle, and communicating the signed blockchain oracle record to a blockchain user, the signed blockchain oracle record being compatible for confirmation on the blockchain according to the consensus rules.

An implementation of any previous implementation may further include wherein the signed blockchain oracle record includes one or more parameters used to calculate the indication of the event extrinsic to the blockchain.

An implementation of any previous implementation may further include wherein the one or more parameters used to calculate the indication of the event extrinsic to the blockchain includes a digital asset price quote filter.

An implementation of any previous implementation may further include wherein the communicating operation is in response to a request for the blockchain oracle record from the blockchain user.

An implementation of any previous implementation may further include wherein the request for the blockchain oracle record includes requested parameters governing the indication of the event extrinsic to the blockchain.

An implementation of any previous implementation may further include wherein the communicating operation is a publishing operation.

Another implementation may include a trusted blockchain oracle record aggregation and publishing system, the system comprising a plurality of extrinsic event modules for collecting information describing an ongoing event extrinsic to a blockchain, and an aggregator filter for processing the information describing the ongoing event extrinsic to the blockchain to yield a set of indications of the ongoing event extrinsic to the blockchain, each indication in the set of indications describing the ongoing event at a discrete point in time, and a trusted oracle feed signer configured to sign indications in the set of indications of the ongoing event extrinsic to the blockchain with a private cryptographic key to yield a set of signed blockchain oracle records, the private cryptographic key being paired with a public cryptographic key associated with the trusted oracle feed signer, and a signed record distributor for communicating one or more signed blockchain oracle records in the set of signed blockchain oracle records to a user of the blockchain.

An implementation of any previous may include wherein the signed record distributor periodically confirms a signed oracle record in the set of signed blockchain oracle records directly to the blockchain according to a periodic schedule.

An implementation of any previous may include wherein the signed record distributor skips confirmation of a user-confirmed signed oracle record in the set of signed blockchain oracle records when the user-confirmed signed oracle record has been first confirmed by the user of the blockchain.

An implementation of any previous may include wherein the trusted oracle feed signer publishes the public cryptographic key at a trusted location associated with the trusted blockchain oracle.

An implementation of any previous may include wherein the signed record distributor communicates the one or more signed blockchain oracle records to the user of the blockchain via an off-line blockchain oracle record chronicle.

An implementation of any previous may include wherein the aggregator filter formats the blockchain oracle record according to the requirements of a smart contact executing on the blockchain.

Another implementation may include a method of invoking a decentralized application on a shared ledger with a blockchain oracle record, including receiving, from a trusted blockchain oracle, a blockchain oracle record being signed by a private cryptographic key paired with a public cryptographic key, the public cryptographic key being associated with the trusted blockchain oracle, and initiating a transaction to the decentralized application on the shared ledger, the transaction calling a function of the decentralized application having parameters including the signed oracle record.

An implementation of any previous method may include selecting the blockchain oracle record from a plurality of blockchain oracle records provided by the trusted blockchain oracle.

An implementation of any previous method may include wherein the decentralized application initiates a second transaction, the second transaction including a digital asset payment to a payment address of the trusted blockchain oracle.

An implementation of any previous method may include determining, based at least in part on a trusted oracle record chronicle, that the trusted blockchain oracle satisfies a reliability condition; and performing the initiating operation if the trusted blockchain oracle satisfies the reliability condition.

An implementation of any previous method may include determining whether the signed blockchain oracle record satisfies a freshness condition; and performing the initiating operation if the signed blockchain oracle satisfies the freshness condition.

An implementation of any previous method may include wherein the decentralized application determines whether the trusted blockchain oracle satisfies a trust condition.

An implementation of any previous method may include wherein the operation that determines whether the trusted blockchain oracle satisfies the trust condition is based at least in part on one of: hardcoding the trusted blockchain oracle public cryptographic key, reading the trusted blockchain oracle public cryptographic key from a state of the blockchain, receiving the trusted oracle public key from a trusted verifier, receiving the trusted oracle public key in an off-chain channel from the trusted blockchain oracle, determining the trust condition is satisfied based on a digital asset payment, and determining the trust condition is satisfied based on a determination the trusted blockchain oracle is not on a blacklist.

An implementation of any previous method may include transmitting a request to the trusted blockchain oracle, the request including signed parameters compatible with the decentralized application.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of confirming extrinsic event records to a blockchain, the method comprising:
   receiving, at a trusted blockchain oracle, indications of events extrinsic to a blockchain, the blockchain applying a set of consensus rules;
   determining whether the indications of events extrinsic to the blockchain satisfy a validation condition;
   signing the indications of events extrinsic to the blockchain with a private cryptographic key kept secret by the trusted blockchain oracle to yield signed blockchain oracle records if the indications satisfy the validation condition, the private key being paired with a public key publicly associated with the trusted blockchain oracle; and
   streaming the signed blockchain oracle records to a blockchain user, the signed blockchain oracle records being compatible for confirmation on the blockchain according to the consensus rules.

2. The method of claim 1, wherein the signed blockchain oracle records include one or more parameters used to calculate the indication of the event extrinsic to the blockchain.

3. The method of claim 2, wherein the one or more parameters used to calculate the indications of events extrinsic to the blockchain includes a digital asset price quote filter.

4. The method of claim 1, wherein the operation that streams the signed blockchain oracle records is in response to a request for the signed blockchain oracle records from the blockchain user.

5. The method of claim 4, wherein the request for the blockchain oracle records includes requested parameters governing the indication of the event extrinsic to the blockchain.

6. The method of claim 1 wherein the operation that streams the signed blockchain oracle records is a publishing operation.

7. A trusted blockchain oracle record aggregation and publishing system, the system comprising:
   a processor;
   a memory communicatively coupled to the processor;
   a plurality of extrinsic event modules stored in the memory and executable by the processor to collect information describing an ongoing event extrinsic to a blockchain;
   an aggregator filter stored in the memory and executable by the processor to process the information describing the ongoing event extrinsic to the blockchain to yield a set of indications of the ongoing event extrinsic to the blockchain, each indication in the set of indications describing the ongoing event at a discrete point in time;
   a trusted oracle feed signer stored in the memory and executable by the processor to sign indications in the set of indications of the ongoing event extrinsic to the blockchain with a secret private cryptographic key to yield a feed of signed blockchain oracle records, the private cryptographic key being paired with a published public cryptographic key publicly associated with the trusted oracle feed signer; and
   a signed record distributor stored in the memory and executable by the processor to stream the feed of signed blockchain oracle records to a user of the blockchain.

8. The system of claim 7, wherein the signed record distributor periodically confirms a signed oracle record in the feed of signed blockchain oracle records directly to the blockchain according to a periodic schedule.

9. The system of claim 8, wherein the signed record distributor skips confirmation of a user-confirmed signed oracle record in the feed of signed blockchain oracle records when the user-confirmed signed oracle record has been first confirmed by the user of the blockchain.

10. The system of claim 7, wherein the trusted oracle feed signer publishes the published public cryptographic key at a trusted location associated with the trusted blockchain oracle.

11. The system of claim 7, wherein the signed record distributor streams the feed of signed blockchain oracle records to the user of the blockchain via an off-line blockchain oracle record chronicle.

12. The system of claim 7, wherein the aggregator filter formats the feed of blockchain oracle records according to the requirements of a smart contact executing on the blockchain.

13. A method of invoking a decentralized application on a shared ledger with a blockchain oracle record, the method comprising:

receiving, from a trusted blockchain oracle, a blockchain oracle record, as part of a stream of signed blockchain oracle records, the blockchain oracle record being signed by a private cryptographic key kept secret by the trusted blockchain oracle paired with a published public cryptographic key, the public cryptographic key being publicly associated with the trusted blockchain oracle; and initiating a valid signed blockchain transaction paying a transaction fee and addressed to the decentralized application on the shared ledger, the valid signed blockchain transaction calling a function of the decentralized application having parameters including the signed oracle record from the stream of signed blockchain oracle records.

14. The method of claim 13, wherein the decentralized application initiates a second transaction, the second transaction including a digital asset payment to a payment address of the trusted blockchain oracle.

15. The method of claim 13, further comprising:

determining, based at least in part on a trusted oracle record chronicle, that the trusted blockchain oracle satisfies a reliability condition; and performing the initiating operation if the trusted blockchain oracle satisfies the reliability condition.

16. The method of claim 13, further comprising:

determining whether the signed blockchain oracle record satisfies a freshness condition; and performing the initiating operation if the signed blockchain oracle satisfies the freshness condition.

17. The method of claim 13, wherein the decentralized application determines whether the trusted blockchain oracle satisfies a trust condition.

18. The method of claim 17, wherein the operation that determines whether the trusted blockchain oracle satisfies the trust condition is based at least in part on one of: hardcoding the trusted blockchain oracle public cryptographic key, reading the trusted blockchain oracle public cryptographic key from a state of the blockchain, receiving the trusted oracle public key from a trusted verifier, receiving the trusted oracle public key in an off-chain channel from the trusted blockchain oracle, determining the trust condition is satisfied based on a digital asset payment, and determining the trust condition is satisfied based on a determination the trusted blockchain oracle is not on a blacklist.

19. The method of claim 13, further comprising:

transmitting a request to the trusted blockchain oracle, the request including signed parameters compatible with the decentralized application.

\* \* \* \* \*